US008458188B2

(12) United States Patent
Salemann

(10) Patent No.: US 8,458,188 B2
(45) Date of Patent: Jun. 4, 2013

(54) VOXEL APPROACH TO TERRAIN REPOSITORIES FOR MODELING AND SIMULATION

(75) Inventor: Leo Salemann, Sammamish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 643 days.

(21) Appl. No.: 12/707,183

(22) Filed: Feb. 17, 2010

(65) Prior Publication Data

US 2011/0202538 A1    Aug. 18, 2011

(51) Int. Cl.
*G06F 17/00* (2006.01)

(52) U.S. Cl.
USPC .... 707/741; 707/802; 707/769; 707/E17.008; 707/E17.056; 345/424; 703/1

(58) Field of Classification Search
USPC .......... 345/418–475; 701/1–28; 707/705–812
See application file for complete search history.

(56) References Cited

U.S. PATENT DOCUMENTS

| 6,407,738 | B1 * | 6/2002 | Wakabayashi | 345/424 |
|---|---|---|---|---|
| 7,050,054 | B2 * | 5/2006 | Halmshaw | 345/424 |
| 7,317,456 | B1 * | 1/2008 | Lee | 345/427 |
| 7,983,474 | B2 * | 7/2011 | Van Workum et al. | 382/154 |
| 2007/0192068 | A1 * | 8/2007 | Shay et al. | 703/1 |
| 2008/0165186 | A1 * | 7/2008 | Lin | 345/419 |
| 2009/0015585 | A1 * | 1/2009 | Klusza | 345/420 |

OTHER PUBLICATIONS

Mennis, Jeremy, L. et al. "A conceptual framework for incorporating cognitive principles into geographical database representation", International Journal of Geographical Information Science, 2000, vol. 14, No. 6, 501-520.*
Lalonde, J., et al., "Natural terrain classification using three-dimensional ladar data for ground robot mobility," [online] Journal of Field Robotics, vol. 23, No. 10, Nov. 2006, pp. 839-861, retrieved from the Internet: <http://www.ri.cmu.edu/publication_view.html?pub_id=5611>.
Pollard, T., et al., "Change Detection in a 3-D World," [online] 2007 IEEE Conference on Computer Vision and Pattern Recognition, Jun. 17-22, 2007, retrieved from the Internet: <www.lems.brown.edu/~tpollard/pollard_mundy_cypr07.pdf>.

(Continued)

*Primary Examiner* — Fred I Ehichioya
*Assistant Examiner* — Michelle Owyang
(74) *Attorney, Agent, or Firm* — Terry M. Sanks, Esq.; Beusse Wolter Sanks Mora & Maire, P.A.

(57) ABSTRACT

A set of sensors can capture raw data that geospatially corresponds to a real world volumetric space. The raw data can include point cloud data encoded in a light detecting and ranging (LiDAR) information format, imagery and video data, and elevation data encoded in a digital elevation model (DEM) or digital surface model (DSM) format. The real-world volumetric space can be segmented into a set of volumetric units, wherein datum of the raw data is indexed against the volumetric units. Each of the volumetric units of the real-world volumetric space can be mapped to a voxel in a storage volumetric space of a voxel database. The raw data can then be stored and fused in the voxel database such that each voxel in the voxel database represents a combination of volumetrically stored data for all source products that includes providing point cloud data, imagery data, and elevation data.

26 Claims, 8 Drawing Sheets

OTHER PUBLICATIONS

Mundy, J., et al., "Uncertain geometry: a new approach to modeling for recognition," [online] Proceedings of the SPIE, Automatic Target Recognition XIX, vol. 7335, pp. 73350Q-73350Q-12, May 4, 2009, retrieved from the Internet: <http://www.lems.brown.edu/~ozge/SPIE-Mundy-OzcanliFinal.pdf>.

Gebhardt, S., et al., "Polygons, point clouds, and voxels, a comparison of high-fidelity terrain representations," 2009 SIWZIE Awards, Simulation Interoperability Standards Organization, Nov. 20, 2009.

* cited by examiner

Diagram 530

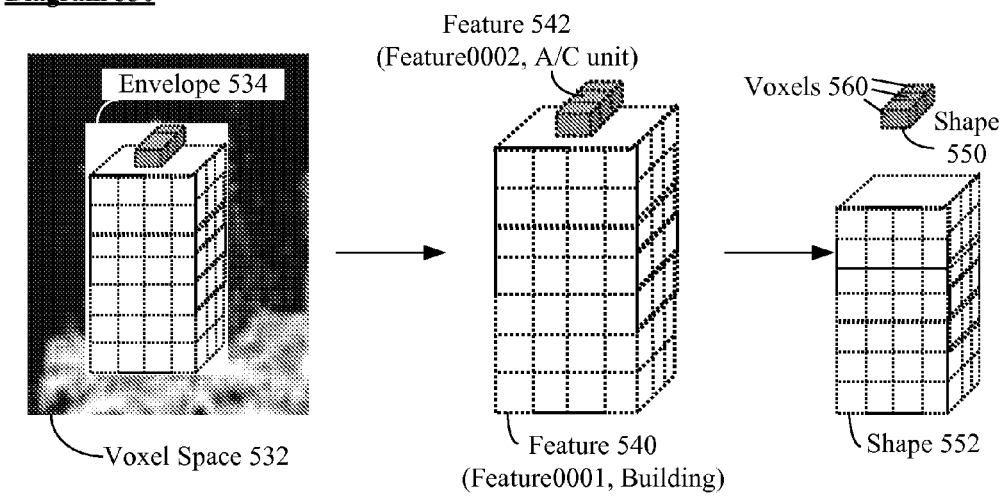

Envelope 534
Feature 542 (Feature0002, A/C unit)
Voxels 560
Shape 550
Voxel Space 532
Feature 540 (Feature0001, Building)
Shape 552

Diagram 560

Voxel-Level Semantics 562

Appearance (Color)
Spectral Signature (MSI, HSI)
Material Composition

Feature-Level Semantics 564

Feature Identifier
Feature Type
Feature Attributes
    Physical Dimensions
    Geographic Name(s)
    Functional Usage

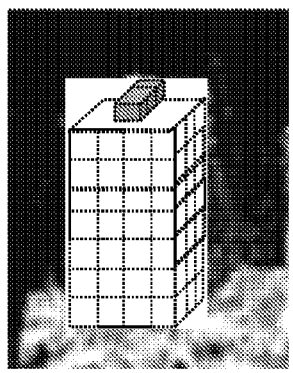

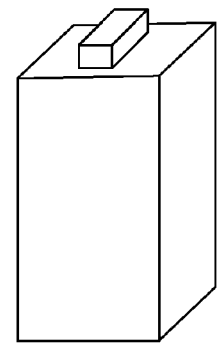

Many voxels relate to one feature

1..*  ←→  1

Bi-directional navigability

*"I am part of a ..."*
*"I am made of ..."*
*"My appearance is ..."*

*"I am a..."*
*"My components are made of"*
*"My dimensions are ..."*

FIG. 5

Voxel Table 610

| VID | SID | SAttr1_Lower | SAttr1_Upper | SAttri2_Lower | SAttri2_Upper ... |
|---|---|---|---|---|---|
| 1 | 1 | M1L VAL | M1U VAL | M2L VAL | M2U VAL |
| 2 | 1 | N1L VAL | N1U VAL | N2L VAL | N2U VAL |
| 3 | 2 | O1L VAL | O1U VAL | O2L VAL | O2U VAL |
| 4 | 3 | P1L VAL | P1U VAL | P2L VAL | P2U VAL |
| 5 | 3 | Q1L VAL | Q1U VAL | Q2L VAL | Q2U VAL |

Shape 3D Table

| SID | FID | Type | X | Y | Z | ... |
|---|---|---|---|---|---|---|
| 1 | 1 | Box | * | * | * | * |
| 2 | 2 | *Box* | * | * | * | * |
| 3 | 2 | *Box* | * | * | * | * |
| 4 | 2 | *Box* | * | * | * | * |
| 5 | 3 | Box | * | * | * | * |
| 6 | 4 | Cylinder | * | * | * | * |
| 7 | 4 | Cylinder | * | * | * | * |
| 8 | 4 | Cylinder | * | * | * | * |
| 9 | 4 | Cylinder | * | * | * | * |
| 10 | 5 | Cylinder | * | * | * | * |
| 11 | 5 | Cylinder | * | * | * | * |

Building Feature Table

| FID | Name | Address | ... |
|---|---|---|---|
| 1 | RI Hospital Trust | 123 4th St | * |
| 2 | *Kennedy Plaza* | *567 8th Ave* | * |
| 3 | Webster Bank | 91011th Pl | * |

Tree-Grove Feature Table

| FID | Name | Genus | ... |
|---|---|---|---|
| 4 | Kennedy Park | Conifer | * |
| 5 | Market Square | Deciduous | * |
| 99 | Specific Attr | Specific Attr | * |
| 199 | Specific Attr | Specific Attr | * |
| 999 | Specific Attr | Specific Attr | * |

FIG. 6

VOXEL APPROACH TO TERRAIN REPOSITORIES FOR MODELING AND SIMULATION

BACKGROUND

The present disclosure relates to the field of simulation systems, three dimensional user interfaces, and terrain repositories and, more particularly, to a voxel approach to terrain repositories for modeling and simulation.

Polygonal modeling has been the standard in three dimensional modeling and terrain representation for over twenty years. Two common polygonal model based techniques that are conventionally used for terrain include regular triangulated networks (RTNs) and triangulated irregular networks (TINs). Regular Triangulated Networks (RTNs) are a computationally-efficient means of capturing all posts in an elevation raster. Triangulated Irregular Networks (TINs) can provide a more natural terrain appearance than RTNs with fewer polygons. Polygonal modeling has enjoyed wide-spread popularity because of its visual realism and its efficiency (at least for terrain modeling based on terrain sensor data having a resolution of one meter or larger ground separation distance between datum points) in data storage and object rendering.

Over the past ten years, visual technology for outputting realistic simulation spaces has improved by leaps and bounds resulting in much greater visual appeal for virtual training simulations. Additionally, dramatic advances have occurred in data acquisition technologies. For example, with the development of precise positioning instruments and inertial navigation systems in the 1980's and 1990s, light detecting and ranging (LiDAR) information became a highly precise and accurate means of collecting elevation samples over a wide geographic area. Similar advances have been made in satellite imagery, unmanned vehicle surveillance devices, and other data acquisition means. Basically, the current state of technology is that an abundance of geospatial data is being generated and a need for precise high fidelity data for driving simulators exists.

Unfortunately, the geometric database representation used for terrain reasoning and information storage has remained relatively stagnant from an innovation perspective. That is, the storage methodologies and techniques for recording and managing a repository of geospatial information have remained largely unimproved.

BRIEF SUMMARY

The disclosure uses a volumetric terrain model of a voxel database to combine and store imagery, elevation, and point cloud data into a single unified data store. Spatial correlation of database stored content is drastically improved over polygonal storage techniques because elevation, image, and vector data types are fused into one data representation which is inherently geospatially synchronized. In one embodiment, feature extraction algorithms can dynamically create multi-resolution terrain feature vector models "on-the-fly" based on the information centrally stored in the voxel database. Thus, customized needs of different end-products can be satisfied while maintaining a single cohesive repository (the voxel database) for geospatial data storage. In another embodiment, simulators can include voxel engines which directly consume voxel encoded data. For example, a simulator can use a voxel based rendering engine instead of a polygon based one to generate visual output for a user interface.

In one aspect of the disclosure, a set of sensors can capture raw data that geospatially corresponds to a real world volumetric space. The raw data can include point cloud data encoded in a light detecting and ranging (LiDAR) information format, imagery and video data, and elevation data encoded in a digital elevation model (DEM) or digital surface model (DSM) format. The real-world volumetric space can be segmented into a set of volumetric units, wherein datum of the raw data is indexed against the volumetric units. Each of the volumetric units of the real-world volumetric space can be mapped to a voxel in a storage volumetric space of a voxel database. The raw data can then be stored and fused in the voxel database such that each voxel in the voxel database represents a combination of volumetrically stored data for all source products that include products providing point cloud data, imagery and video data, and elevation data. The voxel database can be used as a terrain information source by different simulators, which include semi-autonomous force simulators, tactical engagement simulators, immersion simulators, and live simulators.

In one aspect of the disclosure, imagery encoded information, elevation encoded information, and point cloud encoded information can be received from different discrete information products all comprising content of a real-world volumetric space. Data from the different discrete information products can be fused into a voxel database such that each voxel in the voxel database represents a combination of volumetrically stored data for all source products, which comprise the different discrete information products. Different simulators having different geospatial formatting and content needs can be supported from the data encoded in the voxel database.

A voxel database system that includes a voxel database and a voxel server. The voxel database can include a set of voxel indexed records. Each voxel of the voxel database can comprise data fused from a multitude of different discrete products such that each voxel in the voxel database represents a combination of volumetrically stored data for all of the different discrete products. The different discrete products can include point cloud products, imagery products, and elevation products. The point cloud products can include point cloud data encoded in a light detecting and ranging (LiDAR) information format. The imagery products can include imagery and video data. The elevation products can include elevation data encoded in a digital elevation model (DEM) or digital surface model (DSM) format. The voxel server can be for managing data of the voxel database and for supporting a plurality of different simulators having different geospatial formatting and content needs.

BRIEF DESCRIPTION OF THE SEVERAL VIEWS OF THE DRAWINGS

FIG. 5 demonstrates a relationship between voxels, shapes, and features in accordance with an embodiment of disclosure.

FIG. 6 illustrates a set of tables for a voxel GIS in accordance with an embodiment of the disclosure.

DETAILED DESCRIPTION

Figure 1A:
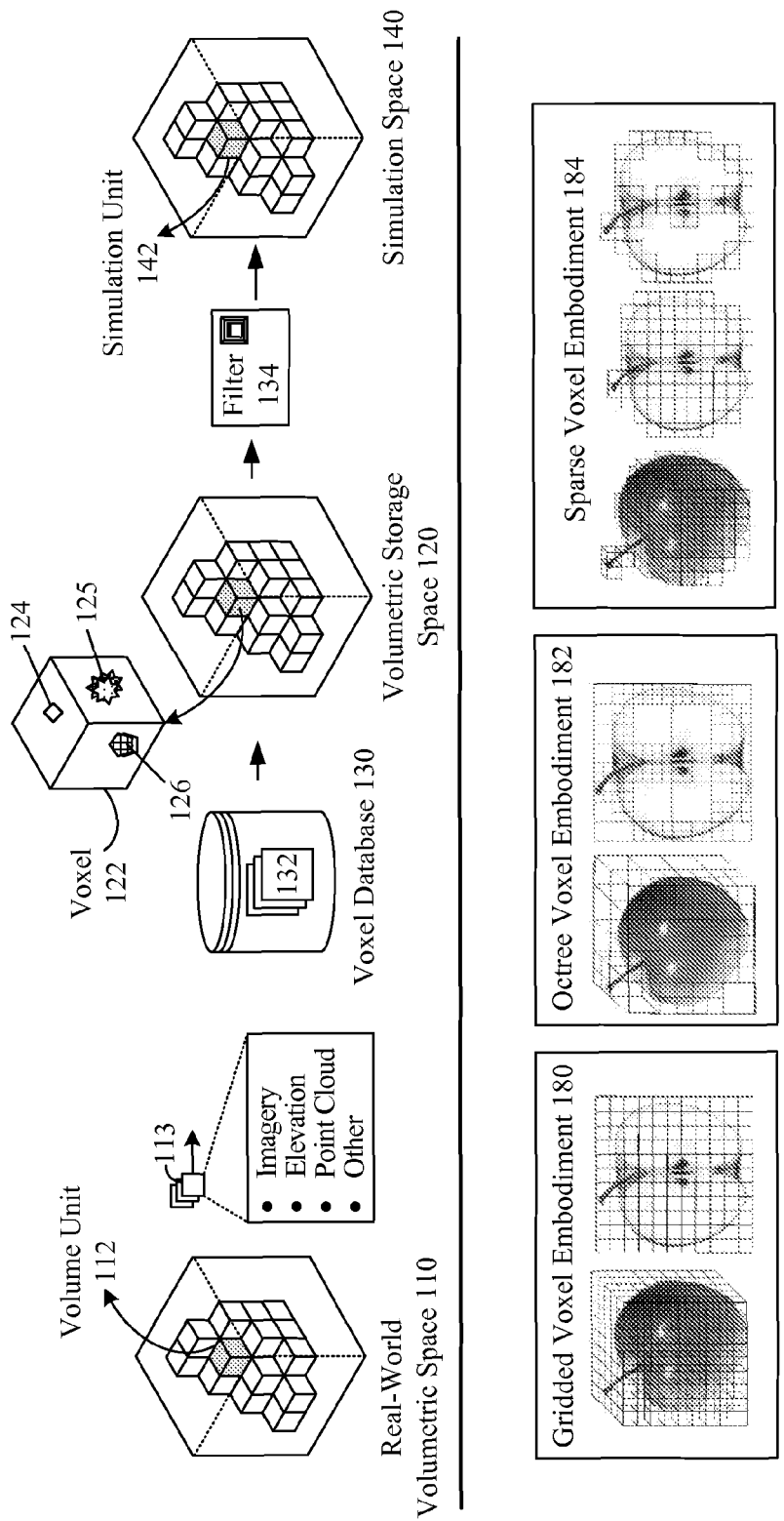
FIG. 1A is a schematic diagram showing a voxel database managing spatially referenced behavioral data for a simulated population in accordance with an embodiment of the disclosure.

The disclosure provides a volumetric storage space 120 in which terrain information is stored. The volumetric storage space 120 can be a space composed of a set of volumetric units, called voxels 122. Data elements can be directly referenced to voxels 122, which permits these data elements to be spatially placed in the volumetric storage space 120. The data elements need not have any specific identity outside their relationship to the voxels 122, which permits raw data to be inserted into the volumetric storage space 120. For example, satellite imagery, LIDAR points, and other information can all be inserted into the volumetric storage space 120 and referenced to voxels 122. Viewed in one manner, each voxel 122 can be thought of as a three dimensional puzzle piece that fits together with other puzzle pieces to form the volumetric storage space 120. Information included in the volumetric storage space 120 can be extracted post-storage. For example, outlines of objects can be detected within the volumetric storage space 120 to determine a presence or absence of a building, vehicle, crowd, or other object within the volumetric storage space 120.

It should be noted that data elements can be continuously inserted into the volumetric storage space 120. In this manner, data elements can be combined to continuously increase a "resolution" of the data image contained within the volumetric storage space 120. In one embodiment, the volumetric storage space 120 can be a probabilistic one. In other words, data elements can be stored in the volumetric storage space 120 that have a probability of being contained therein but have a probability of not actually being contained therein. For example, if an incomplete "data image" of a building (which can be formed by 1 . . . N quantity of voxels) exists in the volumetric storage space 120, an associated probability of the building being present in the volumetric storage space 120 can be at a value of forty percent where a sixty percent probability value exists that the building is not present in the volumetric storage space 120. Thus, the volumetric storage space 120 is able to handle uncertainty of data elements in a manner that traditional storage spaces cannot.

The volumetric storage space 120 can store data elements of any nature. For example, the data elements of the volumetric storage space 120 can include visual information in two or three dimensions. Data elements can also include material composition elements, elevation data, and the like. Any type of information that can be spatially related to a volumetric unit (e.g., voxel) can be stored in the volumetric storage space 120.

Another way of expressing the volumetric storage space 120 is by using database terminology. Stated differently, each voxel 122 can have a unique identifier, which in a database system (e.g., database 130) can be a primary key of a database table having voxel records. Data elements of the volumetric storage space 120 can be attributes of the voxel records. Relative reference points of data elements within a corresponding voxel can be optionally recorded, should a spatial positioning of a data element be needed at a level of granularity less than a single voxel 122. The only linkage of each data element within the database 130 can be defined by its relationship to a voxel 122. That is, instead of referencing visual, material, or other characteristics of a building to that building, as would be the case with a standard database—visual, material, or other characteristics can be referenced directly to voxels 122.

This ability to relate any number of characteristics (e.g., data elements) having a spatial component to the volumetric storage space 120 at a suitable spatial location (via voxel referencing) is significant and unique to a voxel database 130. It is this ability that permits "raw" data to be directly inserted into the volumetric storage space 120. The raw data (e.g., satellite data, for example) when acquired is typically formatted in a spatial manner well suited for proper insertion into the volumetric storage space 120. Otherwise, input acquired from satellites (or similar sources) must be processed and categorized to specific objects (e.g., buildings, roads, etc). These objects are typically stored in databases as discrete entities having object specific attributes. Each time processing occurs, a data loss can result, as assumptions, which must be made during processing, may not be true. For example, during processing, material composition attributes are historically stored against to objects (e.g., buildings, roads, etc.) formed from these materials. There may be, however, uncertainty in which of a set of possible objects are actually present in a given spatial region. Thus, during processing, material composition attributes can be stored against the wrong objects. Conventional practices (that do not utilize a volumetric storage space 120) may attempt to correct for processing errors, as described above. Error correction techniques, however, do not change the fact that there is a fundamental disconnect with the paradigm used for storing data given the manner in which this data is acquired. Use of a volumetric storage space 120 is believed to resolve this disconnect, and believed to achieve numerous advantages as described herein.

FIG. 1A is a schematic diagram for a voxel database 130 that is a terrain repository for modeling and simulation in accordance with an embodiment of the inventive arrangements disclosed herein.

The voxel database 130 is a storage mechanism for a voxel storage space 120, which is a three dimensional space formed from a plurality of volumetric units, which are voxels 122. A unit 112 of a real-world volumetric space 110 can be directly mapped to a voxel unit 122 of voxel space 120. Likewise, a volumetric simulation space 140 can be directly mapped to the voxel storage space 120, in a unit-by-unit manner (simulation units 142 can map to voxels 122). In one embodiment, a set of filters 134 can be used to transform data of database 130 to filter the myriad of voxel attributes stored by voxel database 130 to only provide attributes relevant for a specific simulator.

A voxel database 130 which manages records 132 defining the voxel storage space 120, can receive many different types of data 113 from different data sources. Specifically, imagery, elevation, point cloud, and other information types can be received, processed, and stored in the voxel database 130. The imagery data can include geospatial images and/or video. The elevation data can include digital elevation model (DEM) and/or digital surface model (DSM) data. The point cloud data can include light detecting and ranging (LiDAR) information. The other types of information can include data for a set of geospatially aligned vector datum and/or vector layers, such as road centerlines, water areas, and building footprints. The other types of information can also include semantic information, weather information, material composition information, texture information, and the like.

When the data 113 is placed in the voxel database 130 it is fused together, such that each voxel 122 represents a combination of all source products received up to that point in time. For example, data item 124 can represent a single point of data (data 113) from a single source. Data item 125 can represent a combination or fusing of three points of data (data 113). Data item 126 can represent a combination of two points of data. Any number of data items (1 . . . N) can be combined within specific voxels 122 of voxel storage space 120. The combination (fusion) of data into specific voxel units 122 can be based on a summation, an averaging, or other statistical algorithm.

The voxel database 130 can use any of a variety of different voxel-based representations, such as gridded voxel storage (shown by embodiment 180), sparse voxel storage (shown by embodiment 184), octree voxel storage (show by embodiment 182), and combinations thereof. The embodiments 180-182 show a single graphical object (an apple) for simplicity of expression. In practice the items being stored will generally be terrain based items (and not fruit).

Gridded voxel models (embodiment 180) treat a volumetric data set of database 130 as a stack of individual voxel "slices" with each voxel slice, or grid, being one voxel deep. Processing and querying of this voxel data model can be performed slice by slice until all slices have been processed. The gridded voxel model of embodiment 180 introduces some efficiency in processing as only one slice is processed at a time. It does not, however, allow for the compression or aggregation of similar voxels 122 into less dense representations, as other voxel data models (embodiments 184-182) do. In embodiment 180, each and every location within the XYZ dimensions of the terrain will contain a voxel 122, including areas of no data.

Sparse voxel models (embodiment 184) store only those voxels 122 in database 130 which actually contain information. For example, consider a voxel model in which each cell stores four values: red, green, blue, and opacity. A gridded voxel model representation of an apple (embodiment 184) takes the form of a cube of sufficient size to enclose the apple. Every voxel 122 in the cube can contain a color/transparency value, even if it were (0,0,0), representing "air" or "vacuum." It is important to note that all voxels require the same amount of storage, whether they encode "air" or some portion of the apple. In contrast, a sparse voxel model would actually be shaped like an apple. The "air" voxels 122 simply would not exist, as shown by the diagram for embodiment 184 shown in FIG. 1A. The storage savings for a sparse voxel model are even more dramatic for hollow and porous structures. For example, pretending the inner flesh of the apple did not exist, a significant amount of voxels 122 storage space is saved by only modeling the skin, stem, and core.

Octree voxel models (embodiment 182) consist of a data structure for database 130 in which each internal node has up to eight children. The volumetric storage space 120 is compressed or partitioned by combining collections of identical and adjacent voxels 122 into larger aggregates. Doing so allows for greater data compression, especially in areas that are homogenous or areas where no data is present. When modeling terrain, "empty" voxels 122 can often account for over ninety-five percent of the voxels 122 in a data set, therefore the space 120 savings can be substantial. In the apple example, an enclosing cube similar to the gridded voxel model is utilized excepting that much of the surrounding "air" would be modeled as large uniform blocks. Similarly, the interior of the apple can be of uniform color. In both the grid (embodiment 180) and sparse voxel models (embodiment 184), the interior of the apple would be filled with adjacent voxels of uniform size, all sharing the same color value. In an octree voxel model (embodiment 182), this same information is captured in smaller numbers of larger voxels 122.

Figure 1B:
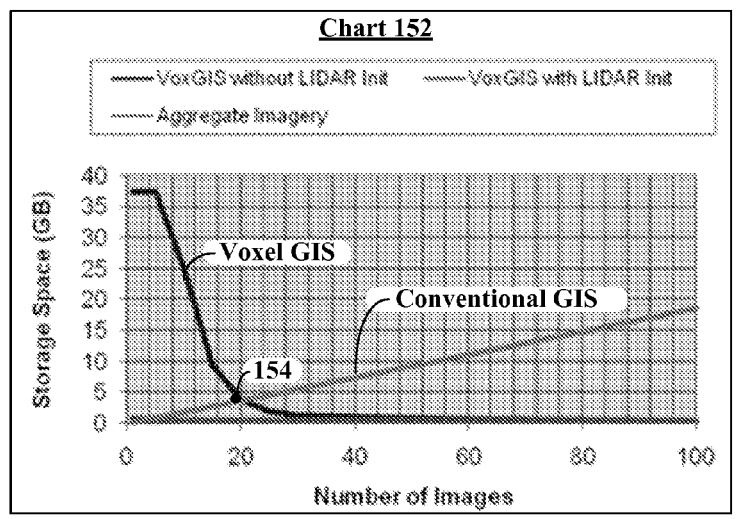
FIG. 1B shows storage efficiency of a voxel database and use of a voxel database as a centralized storage space in accordance with an embodiment of the disclosure.
Figure 1B:
Figure 1B:
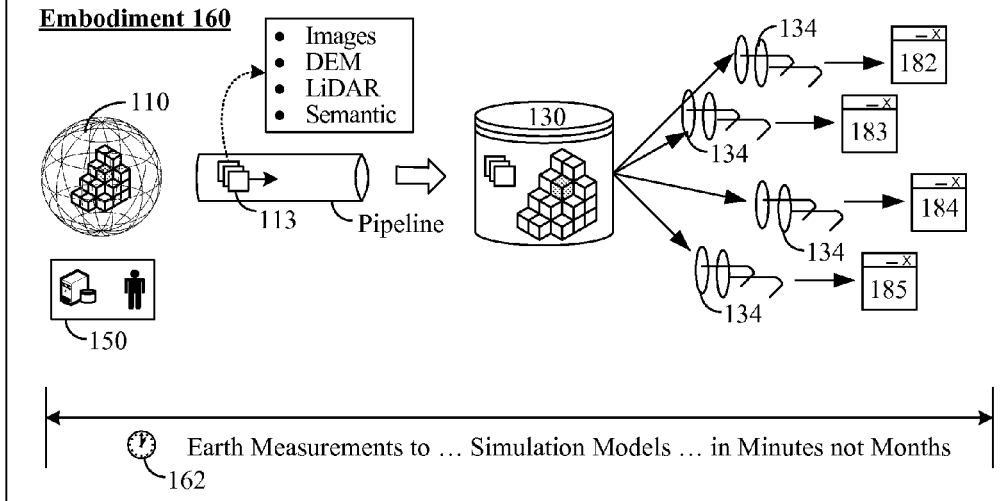

Diagram 150 of FIG. 1B shows how the voxel database 130 is able to efficiently aggregate information. This aggregation efficiency actually accelerates as information density increases. For example, as a number of data sets encoded within voxel database 130 increases, voxel database 130 storage requirements can actually decrease (or at least become more efficient than the straight line increase experienced using traditional geospatial storage systems). Aggregation efficiency results from the "holographic-like" nature of voxel storage space 120, where an increase in information density increases clarity of the voxel space 120. Uncertainty is reduced, which can reduce storage requirements (e.g., decreasing overhead needed for maintaining "noise" or abnormal data points in voxel space 120).

Aggregation efficiency of the voxel database 130 is represented in diagram 150 by a set of images 155-158 of a stored voxel space 120. The images 155-158 are static geospatial images of real-world terrain (space 110) taken from satellite images, yet the demonstrated principle is consistent regardless of the specific input being encoded in voxel storage space 120. For example, as more imagery, elevation, point cloud, terrain vector, and other information is captured and fused into voxels 122 of space 120, it becomes increasingly refined.

Image 155 shows a visual depiction of a voxel space 120 formed from ten images. Image 156 shows the same voxel space 120 after twenty images have been processed. Image 157 shows the voxel space 120 after thirty images. Image 158 shows same voxel space 120 that has been refined using LiDAR points in conjunction with the thirty images. As shown, it becomes evident that an increase in information density decreases uncertainty of an encoded voxel space 120 and increases "fidelity" of the stored information. It is also shown that different types of content (imagery, elevation, point cloud, other) are combinable, which results in the increased fidelity. That is, as information density increases surface probabilities become better defined. More voxels (and associated data) in "empty space" can be discarded. This is true regardless of which voxel encoding mechanism (gridded, sparse, or octree) is used.

It can be mathematically shown that as information density approaches infinity, storage space requirements for the voxel database 130 approaches (effectively equals) a theoretical minimal storage space required by the data being stored. At relatively low information densities (compared to that currently being handled by intelligence agencies) a cross-over point 154 occurs, where it is more efficient to store equivalent data within a voxel database than it is to store equivalent data in a non-voxel geospatial database (e.g., a conventional GIS). Post cross-over point 154 voxel database 130 storage space advantages continue to increase, as shown by chart 152. It should be noted that although many examples presented herein are in context of intelligence activities, voxel database 130 aggregation efficiencies and techniques are domain independent and can be used for any geospatial data set.

Embodiment 160 of FIG. 1B provides another description for populating and using voxel database 130. Using embodiment 160 as a description reference, data 113 captured from a real-world volumetric space 110 can be conveyed over a single pipeline to a voxel database 130. The data 113 can come from many sources 150, such as satellite imagery, digital elevation model (DEM) data, video, LiDAR, SIGINT, HUMINT, and the like. Additionally, the filtered (134) voxel database 130 can provide data for multiple different types of simulators (simulation space 140). For example, assuming the simulators all include terrain models for a real-world volumetric space 110, semi-autonomous forces (SAF) simulators 182, tactical engagement simulators (TES) 183, immersion simulators 184, live simulators 185, behavioral simulators, and the like can all be generated from voxel database 130 stored records 132.

In one embodiment, the common database 130 product can be a probabilistic one in which uncertainty is handled. In one embodiment, a query engine for the database 130 can include multiple different components for producing different queries (e.g., mission rehearsal query, training query, analysis query, etc.), which handle uncertainty in different manners for different types of consumers. It should be appreciated that embodiment 130 can be largely automated, which permits the process 162 from taking measurements, to producing simulation models to occur within minutes (under thirty minutes or under twenty four hours, for example) and not months, as is the case with conventional information gathering and modeling processes. Thus, in one embodiment, a real world (110) situation can be directly mapped to simulation space 140, in a rapid enough manner to permit users to construct scenarios as part of a mission planning and/or mission rehearsal phase of an engagement. The real world data 113 can also be captured and expressed in a simulated space 140 for a live (slightly time delayed in some cases but containing data no more than twenty four hours old) model of a current real-world situation for a geographic space 110.

Figure 2:
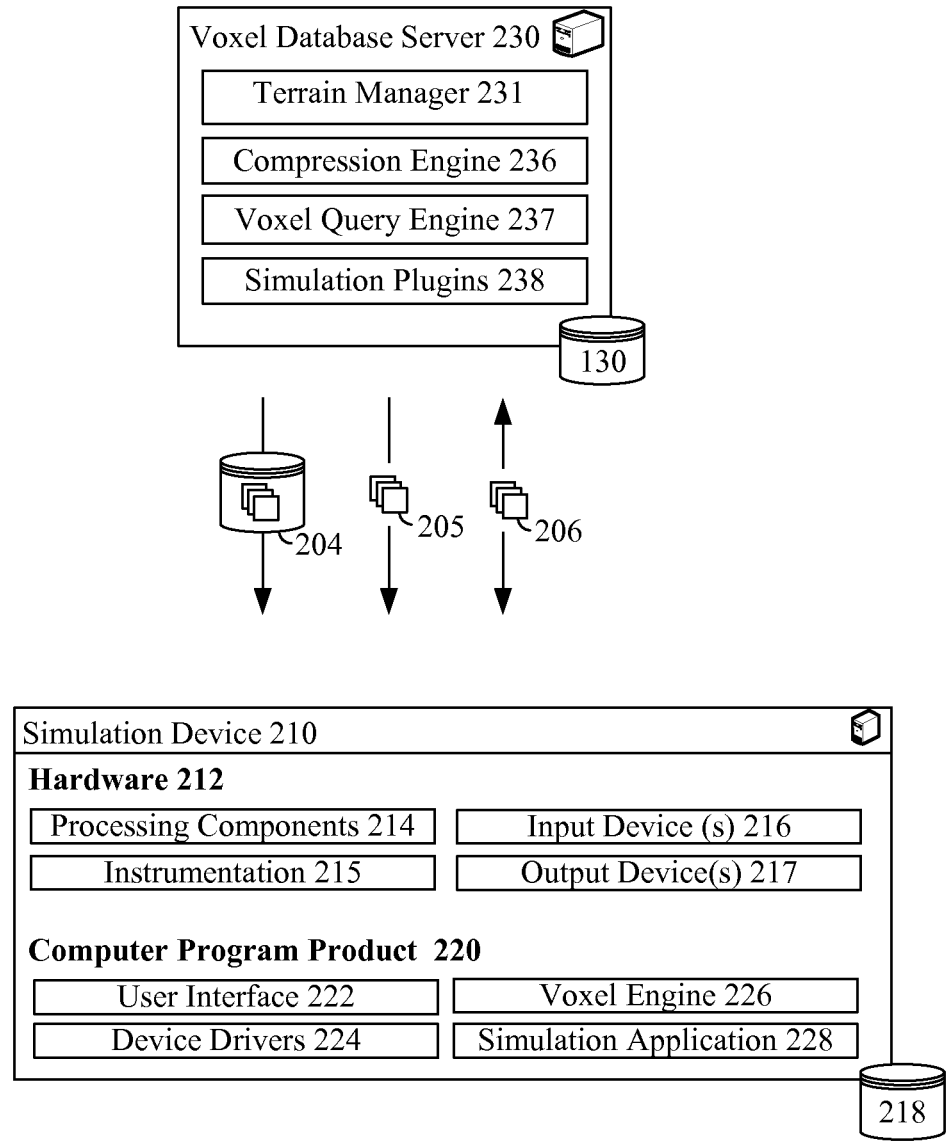
FIG. 2 shows a relationship between a voxel database server and a simulation device in accordance with an embodiment of the disclosure.

FIG. 2 shows a diagram of a voxel database server 230 providing information to simulation device 210 in accordance with an embodiment of the disclosure. The voxel database server 230 can be a server providing specific functions for the voxel database 130. Many different simulation devices 210 can be served from the common repository 130. Data feeds from server 230 to simulation device(s) 210 can be unidirectional (204, 205) or bidirectional (206) and can be time delayed (204, 205) or real-time (which includes near-real-time) 206.

For example, the server 230 can utilize a set of plug-ins 238 specific to device 210 to generate a simulator specific model 204. This model 204 can be in a voxel (or volumetric raster) based format, when conveyed to a simulation device 210 having a voxel engine 226. The model 204 can also be in a vector format, which is converted by server 230 specifically for use by a particular type of simulation device 210. A model 204 can contain all the information needed by simulation device 210 and need only be generated and conveyed from the server 230 to the device 210 once.

In contrast, a feed of a set of data 205 can be continuously and/or intermittent to a simulation device 210. For example, a region-specific data set 205 can be provided to simulation device 210, which can be updated from database server 230 whenever the simulator is to include terrain from a different region.

In one embodiment, terrain data 206 can be streamed from the voxel database server 230 in real time. This permits live data provided by server 230 to be immediately consumed by a set of simulation devices 210.

The voxel query engine 237 can provide a single standard mechanism for querying data of voxel database 130. This is true regardless of whether the database 130 stores information homogeneously or heterogeneously. Further, in one embodiment, some information can be stored volumetrically (e.g., references against specific voxel units) while other information is stored against a set of real-world object identifiers (features) for objects present in a volumetric space. In such a case, cross indexing can exist in the voxel database 130 and querying via voxel query engine 237 can still occur in a user (e.g., simulation device 210) transparent fashion.

Simulation device 210 can be device for presenting simulation space 140 data. Simulation devices 210 can vary greatly in terms of hardware 212 and computer program products 220 used, which causes user interfaces 222 to vary accordingly.

The hardware 212 can include a number of components 214-218. Processing components 214 of the hardware 212 can include one or more microprocessors, memory 218, a bus, network cards, and the like. Instrumentation 215 can include radar displays, altimeters, speedometers, and other buttons and gauges. Input devices 216 can include a keyboard, mouse, touch screen, joystick, cameras, movement detectors, pressure sensors, temperature sensors, laser sensors (e.g., Multiple Integrated Laser Engagement System (MILES) compliant ones) and the like. The output devices 217 can include visual displays, audio speakers, and/or other sensory output devices (e.g., somatosensory output devices, olfaction output devices, gustation output devices, etc.).

The computer program products 220 of the simulation device 210 can include user interface 222, voxel engine 226, simulation application 228, device drivers 224, and the like. The device drivers 224 can facilitate communications between an operating system (not shown, but is one contemplated computer program product 220) and a specific hardware (such as devices 214-218).

Voxel engine 226 can be an engine able to consume data of the voxel database 130. In one embodiment, the engine 226 can process a set of voxels 122 or a portion of voxel space 120 consisting of any number of voxels. The voxel engine 226 can generate terrain features for a simulation space 140. That is, engine 226 can include a graphics engine that is voxel-based (as opposed to being vector based). Engine 226 can also directly consume voxel-mapped semantic data, which can be presented upon a visually rendered map or within illustrated terrain. In one embodiment, the voxel engine 226 can handle uncertainty and can inherently be probabilistic in nature. In one embodiment, raw (possibly filtered via filter) voxel data can be used to render video and to produce other model (non-visual) output using output devices 217.

Simulation application 228 can include any executable program that utilizes geospatial data of the voxel database 130. The user interface 222 can be a part of the application 228 code and/or can be a front-end for the application 228 code. In various embodiments, simulation application 228 can include an immersion simulation application, a constructive simulation application, a real-world simulation used by intelligence analysts, and the like.

Figure 3A:
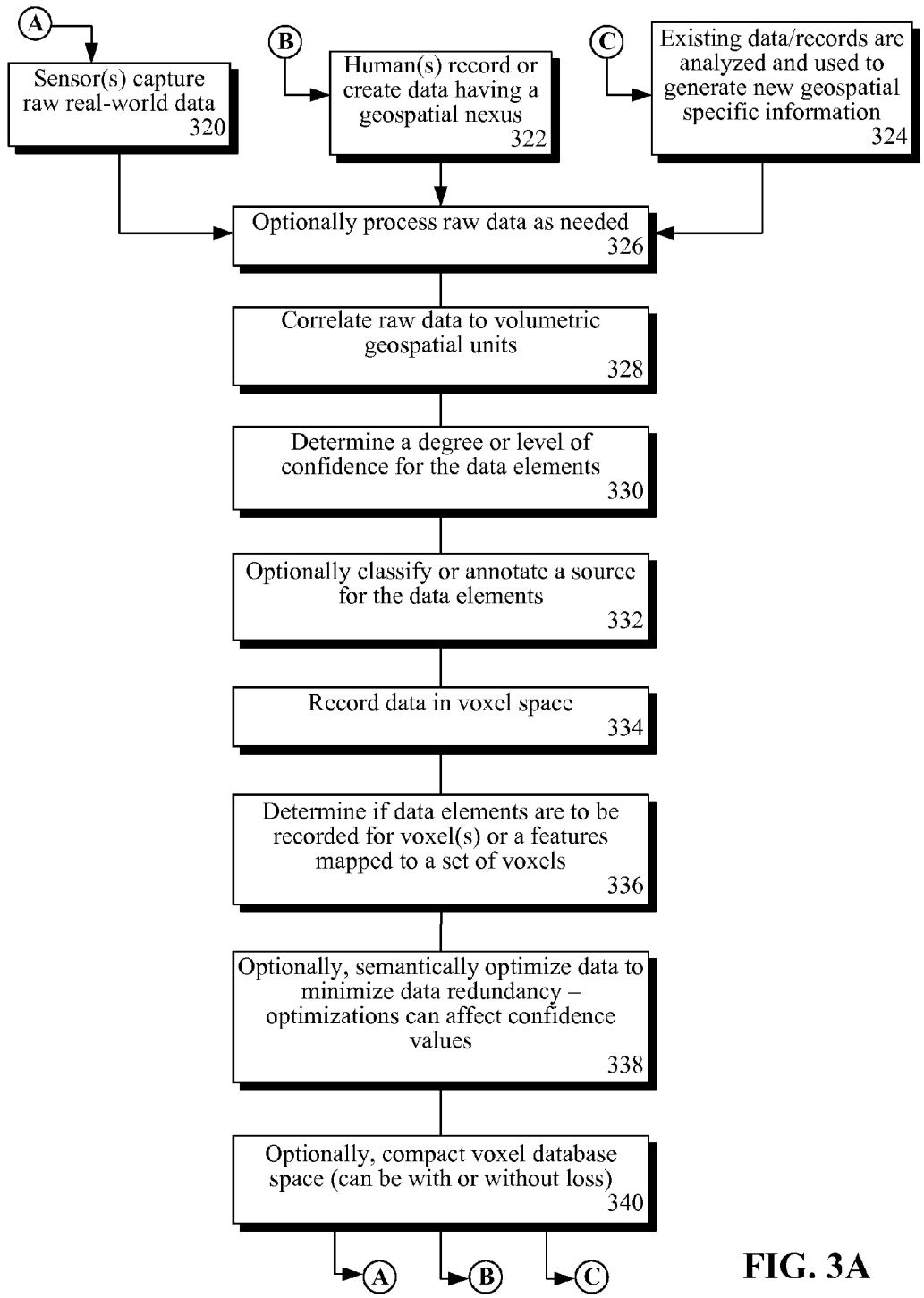
FIG. 3A is a flow chart of a process to acquire voxel database information from a data source in accordance with an embodiment of disclosure.

FIG. 3A shows a process 310 to acquire voxel database 130 information from a data source 150 in accordance with an embodiment of disclosure. In process 310 data can be continuously received from a variety of sources, which include completely automated data capture sources (step 320), human data sources (step 322), and generating new intelligence data (or other information) by analyzing and combining existing source data (step 324). This data can be continuously handled by the process, as represented by process 310 proceeding from step 340 to steps 320, 322, and/or 324. In process 310, data acquisitions and processes can occur in real-time or after an appreciable delay (e.g., handled in batch) depending upon implementation choices. Further, process 310 actions can occur asynchronously/synchronously as well as cyclically/randomly/based on conditional events depending on contemplated implementation choices.

Regardless of how raw data is gathered (step 320, 322, or 324), the data can be optionally processed as needed, as shown by step 326. In step 328, the raw data can be correlated to volumetric geospatial units and/or to populations present in the units. For example, data can be mapped to absolute or relative points in geographic space.

In step 330, a degree or level of confidence for the mapped data elements can be determined. In optional step 332, data elements can be classified in accordance to a source type and/or a specific data source can be tagged or otherwise related to the data elements.

The data elements can be recorded in voxel space meaning the data elements can be encoded into a voxel database, as shown by step 334. The voxel database can optionally establish features composed of one or more shape primitives. These features can be related, such as through relational database (RDBMS) indexes and database primary/secondary keys, to voxels. An RDBMS is one contemplated indexing tool and other indexing mechanisms can be used with the disclosure. When data elements are recorded in voxel space, a determination can be made as to whether each data element is to be referenced against a set of one or more voxels, against a defined feature, or both, as indicated by step 336.

In optional step 338, data can be semantically optimized to minimize data redundancy. For example, approximately equivalent data from multiple sources can be combined into a common data element. This semantic combination can affect confidence values associated with a data element. For example, when multiple sources report a single data element consistently, a confidence value in that data element will increase. In optional step 340, a voxel database space can be compacted to minimize storage requirements. Different voxel (e.g., raster-based) compaction algorithms can be utilized, which include loss-less compaction algorithms and lossy compaction algorithms.

Figure 3B:
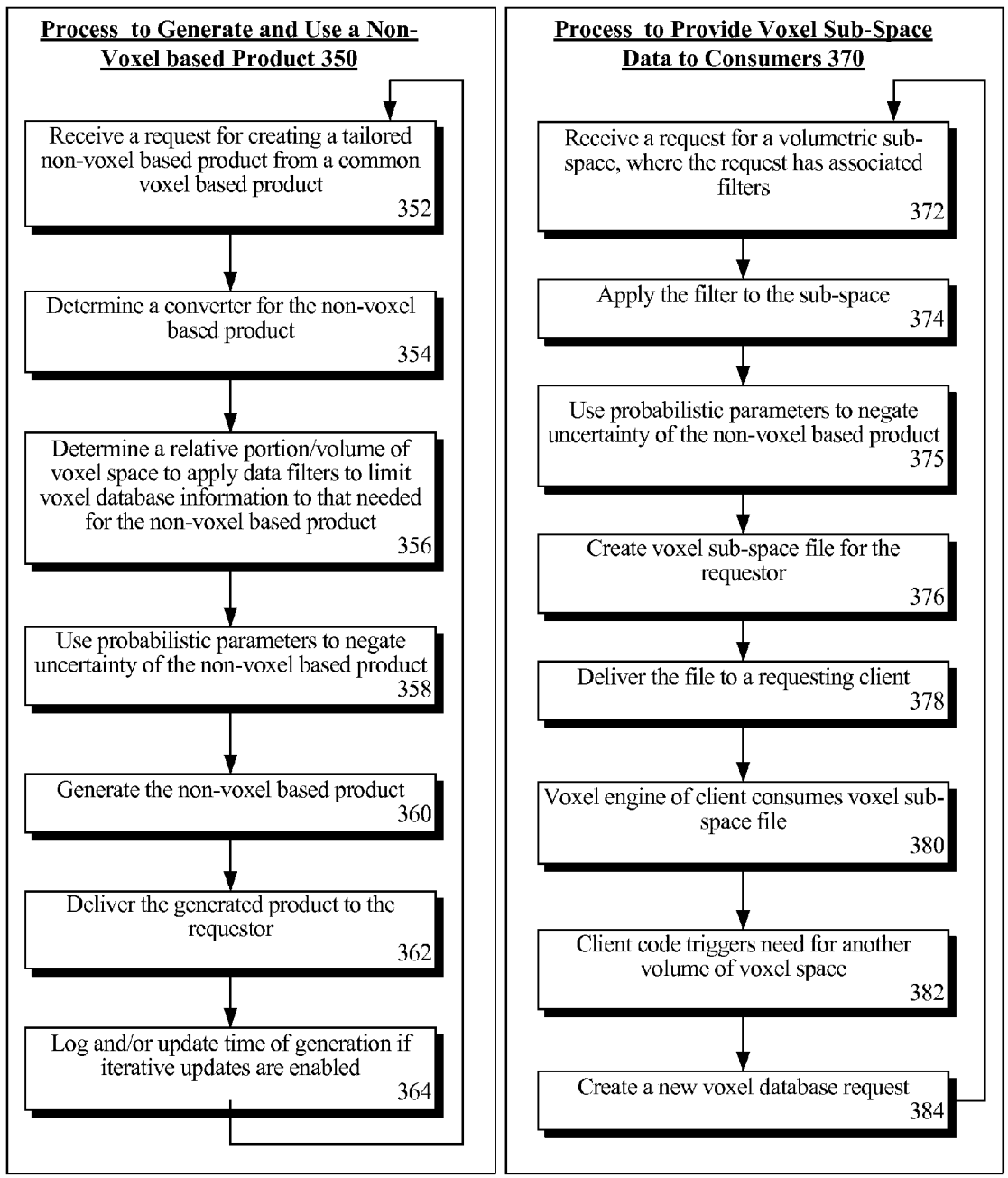
FIG. 3B is a set of flow charts for utilizing data of a voxel database in accordance with an embodiment of disclosure.

The voxel database populated through a process, such as process 310, can thereafter be treated as a common repository or centralized source for geospatially related information. This centralized source can be utilized by different consumers in different ways. In one scenario (process 350 shown in FIG. 3B), the voxel database can be used to generate a non-voxel based product, such as a SAF component. In another scenario (process 370 shown in FIG. 3B), the voxel database can provide voxel-subspace data sets to requestors, which these requestors can consume directly utilizing an internal voxel engine.

Process 350 can begin in step 352, where a request is received by a voxel database server. The request can be for creating a tailored non-voxel based product from a common voxel based product. An appropriate converter for the request can be determined in step 354.

In step 356, a relative portion or volume of voxel space needs to be determined. That is, the request will rarely be for an entire volume region stored by the voxel database, but will likely be for a volumetric subspace specifically needed by the non-voxel based product. Additionally, data within the requested volumetric subspace can be filtered by applied data filters, so that only the information needed for a specific product of the request is considered. In step 358, probabilistic parameters can be utilized to negate uncertainty inherent in the voxel database (in one embodiment) when generating the non-voxel based product. Different thresholds and/or parameters can be utilized to determine what level of uncertainty is to be retained within the non-voxel based product, which is generated in step 360. The generated product can be delivered to the requestor in step 362.

Some generated products can require periodic updates form the voxel database in order to retain information currency. In one embodiment, optimizations can be implemented so that only relatively new information needs to be considered for some update operations. When iterative updates are a concern, information can be logged and/or time attributes of the voxel database can be updated as appropriate, which is shown by step 364. The process 350 can repeat as needed, which is expressed by proceeding from step 364 to step 352.

Process 370 can begin in step 372, where a request for a volumetric sub-space is received. The request can have a set of associated filters. Unlike process 350, it is contemplated that a requestor of process 370 can directly consume voxel encoded information. In step 374, the filter can be applied to the voxel sub-space to conditionally exclude data of the voxel database. This is important as the voxel database can be a centralized repository that stores a myriad of data attributes in a voxel related manner, where only a subset of the data attributes are of concern for a specific requestor. In optional step 375, probabilistic parameters can be applied to negate uncertainty when generating the voxel sub-space. This optional step 375 can be utilized when satisfying a request (step 372) for a non-probabilistic voxel subspace.

In step 376, a file (or set of files) containing the requested information can be created. In step 378, the created file(s) can be delivered to a requesting client, such as by delivering the file(s) over a network. A voxel engine of the client can consume or utilize the voxel sub-space file, as shown by step 380. In one embodiment, the voxel database can be directly accessible and used by the clients, in which case a creation and utilization of a locally created file (of a voxel subspace) can be unnecessary.

In one embodiment, the voxel sub-space files can be encoded in a local media storage area (e.g., hard drive) for use by a client as needed. This prevents a need for continuous and/or stable network connectively between the client and the voxel database. In one embodiment, suitable voxel sub-space laden files can be encoded in a portable medium (e.g., optical, magnetic, or other) and disseminated/located to clients periodically.

In another embodiment, data sets can be continuously requested by a client such as a SAF component needing a data set for a different volumetric space. That is, executing client code can trigger a need for another volume of voxel space, as shown by step 382. When no local cache exists for this needed information, a new voxel database request (submitted over a network) can be created, as shown by step 384, which results in the request being handled in step 372.

Figure 4:
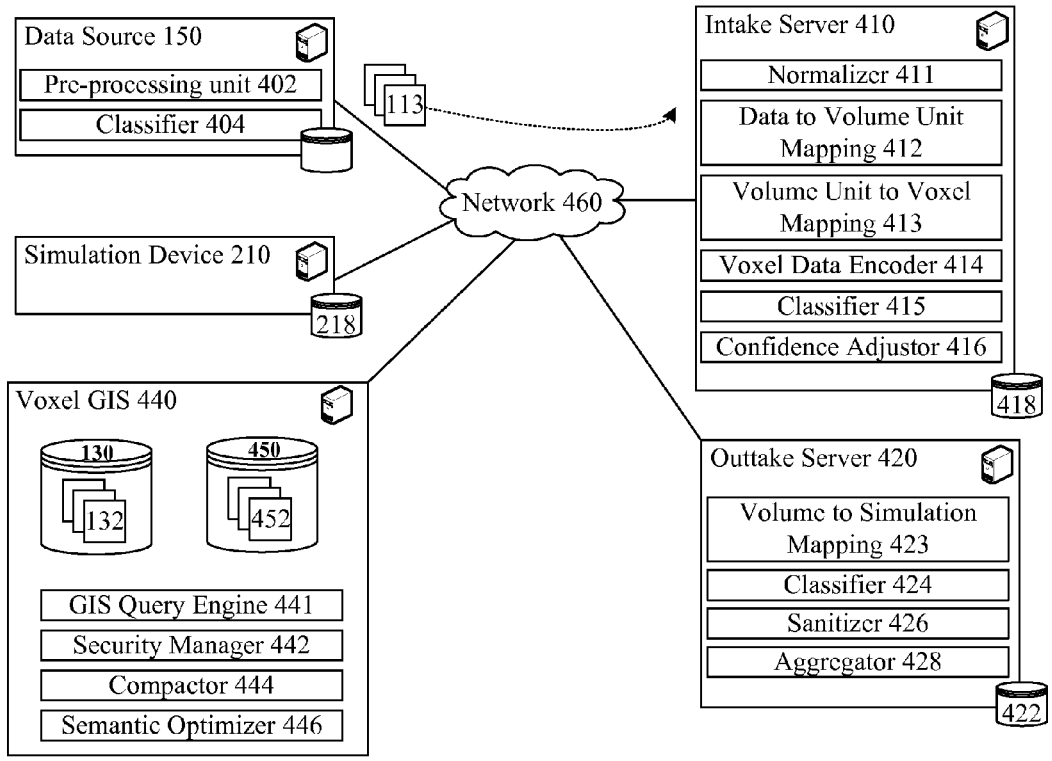
FIG. 4 is a schematic diagram of a system including a voxel database in accordance with an embodiment of disclosure.
Figure 4:
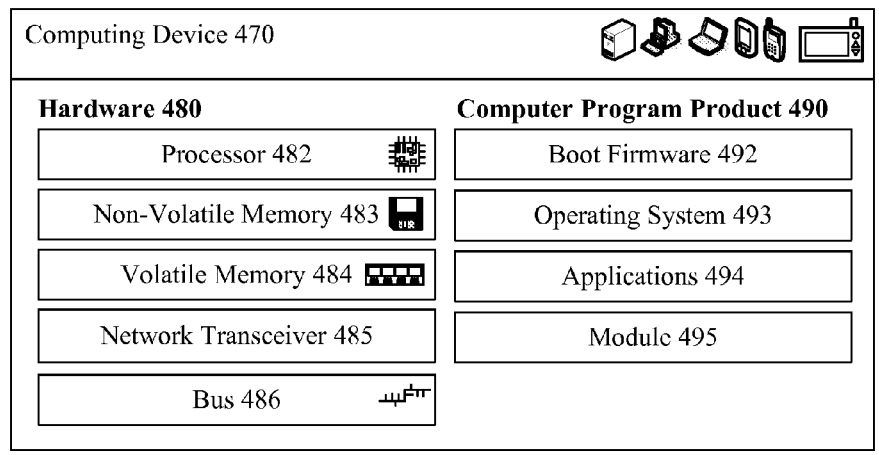

FIG. 4 is a schematic diagram of a system 400 including a voxel database 130 in accordance with an embodiment of the inventive arrangements disclosed herein. In system 400, a set of data sources 150, a set of simulation devices 210, an intake server 410, an outtake server 420, a Voxel geographic information system (GIS) 440, and other such components can be communicatively linked via a network 460. In lieu of connectivity via network 460, components of system 400 can exchange information via portable media data exchanges, paper document correspondences, human-to-human communications, and the like. The shown components (as items 150, 410, 420, 210, 440) represent one embodiment of the disclosure and are not to be construed as being a limitation of the disclosure's scope.

Various components of system 400, such as items 150, 410, 420, 210, 440, can include one or more computing devices 470, which can include hardware 480 and computer program products 490. The computing devices 470 can be general purpose computing devices, such as personal computers, servers, or in-vehicle computers. The devices 470 can also be special purposed devices specifically manufactured/constructed for a tailored purpose. A special purposed device can have unique hardware, electronic boards, firmware, etc., which is not able to be easily modified by software and used for a different purpose. In various embodiments, devices 470 can be implanted as stand-alone devices, as virtual devices, as distributed devices, as cooperative devices, and the like.

Hardware 480 can include a processor 482, nonvolatile memory 483, volatile memory 484, network transceiver 485, and other components linked via a bus 486. The computer program products 490 can include programmatic instructions that are digitally encoded in a memory (e.g., memory 483, 484) and able to be executed by the processor 482. Computer program products 490 include boot firmware 492, (e.g., basic input/output system (BIOS)), an optional operating system 493 (i.e., special purposed devices can be optimized so an operating system 493 is merged with applications 494 and/or modules 495), applications 494, and other executable modules 495. The operating system 493 can include mobile device operating systems, desktop operating systems, server operating system, virtual operating systems, and/or distributed operating systems.

Unlike many computing systems, system 400 can be a security sensitive one where data classifications are highly important. That is, information acquired from data sources 150, stored in voxel GIS 440, and used to drive simulation devices 210 can include unclassified, secret, top secret (including compartmentalizations) information. Classification components 404, 415, 424 can exist, which implement comprehensive and conservative rules to automatically classify information into appropriate classifications. Additionally, sanitizers (e.g., sanitizer 426) can be used in system 400 to downgrade semantic content (e.g., from secret to unclassified, for example) of conveyed data elements to ensure that classification based restrictions are not violated. Moreover, different network 460 channels and information handling standards can be imposed based on classification level of the information being conveyed. A further complication is that aggregating and/or analyzing data from different sources 150 can change a classification level of the base data. Automated mechanisms (i.e., classifier 414, aggregator 428, and/or voxel GIS 440, when aggregating data from multiple sources 150, can reevaluate and appropriately adjust resultant security classification levels) to conservatively handle data classifications are needed in system 400, especially in embodiments where data acquisition to model production (e.g., duration 162 of embodiment 160, for instance) is expedited.

The security sensitivity requirements can result in physically separate channels (e.g., within network 460, for example) for information conveyance. Further, storage regions for the different data classifications (e.g., within voxel GIS 440, for example) can remain isolated from each other. Known standards for handling classified information exist as do a myriad of automated techniques, which can be utilized for system 400. Various components (classifier 404, 414, 424, security manager 442, sanitizer 426) are shown in system 400 to express that system 400 can implement security classification technologies. Comprehensive coverage of these known technologies is not the focus of this disclosure. For simplicity of expression, classification techniques have not been overly elaborated upon herein. It should be understood that integration of classification specific techniques for information handling are contemplated for the disclosure.

It should also be acknowledged that the specific arrangements of system 400 are expected to vary from implementation-to-implementation. For example, discrete network 460 attached servers are shown for intake (intake server 410) and outtake (outtake server 420) of information to and from the voxel GIS 440. As shown, intake server 410 can perform intake processing operations (process 310, for example). Outtake server 420 can perform out taking processing operations (process 350 and/or 370, for example). In one embodiment, operations attributed to server 410 or 420 can be integrated into the voxel GIS 440 or other system 400 components (e.g., one or more intake server 410 operations can be performed by data source 150; one or more outtake server 420 operations can be performed by simulation device 210). For example, in one embodiment, pre-processing unit 402 can optionally perform operations described for normalizer 411 and/or data to volume unit mapping component 412.

In one embodiment, the components (441-446) of the GIS 440 can be distinct from those of a voxel database server 230 (e.g., components 236-238 of FIG. 2), such as being implemented within a different, yet compatible, software layer. In another embodiment, one or more of the components 441-446 can be functionally merged with components 236-238 as described herein.

Additional components not explicitly expressed in association with system 400, which are consistent with performing operations described in the disclosure, are to be considered present in system 400. Further, logical mappings from system 400 components to operations described herein are assumed to be present. For example, in various contemplated embodiments, compactor 444 can perform operations described in step 340 of FIG. 3A; semantic optimizer 446 can perform operations described in step 338 of FIG. 3A; and, confidence adjustor 416 can perform operations previously described in step 330 and 338.

Turning to voxel GIS 440, a number of characteristics should be noted. First, as new information for voxel GIS 440 is acquired (from data sources 150), a probability distribution of surface location and surface appearance can be dynamically and programmatically constructed (using Bayesian statistical learning algorithms, for example). In this sense, voxels of the GIS 440 do not store a fixed appearance (of volume units 112 from a real-world volumetric space 110) but instead store a dynamic probability of multiple appearances, which can be learned and/or refined over time.

This characteristic of GIS 440 not only permits efficient handling of uncertainty, but turns traditional data overload challenges into an advantage. That is, over time, information acquisition via satellites, SIGINT, and other automated sources have geometrically increased. Concurrently, the quantity of human analysts responsible for rapidly responding to acquired information has decreased and/or remained constant. In the past, different information channels or products from different sources 150 were handled in a stove-piped manner. Different human analysts would receive and/or analyze satellite data, SIGINT data, HUMINT data, and the like. One result of this situation is that collected data is often not analyzed in a timely manner. Additionally, collected data is typically analyzed in isolation (e.g., single images from satellites are analyzed by people lacking pertinent geospatial related data from other sources 150). Fusion tools are currently deficient and/or lacking, which is a situation expected to worsen in absence of a paradigm shift in how information is managed and analyzed. The voxel GIS 440 is a central component for this needed paradigm shift.

In voxel GIS 440 information can be indexed against voxels in different manners. In one embodiment, some records 132 can be directly indexed against uniquely identified voxels. Other records 452 can be indexed against features, which are stored in a feature data base 450. Cross indexing between voxel database 130 and feature database 450 can occur.

A feature can be a representation of an object in a physical world (or a simulated object) having its own unique identity and characteristics. Buildings, trees, highways, rivers, lakes, and the like are examples of features. A volume in voxel storage space 120 occupied by a feature can be defined by a volumetric envelope. The volumetric envelope can be composed of one or more shape primitives. Shape primitives can be a set of basic volumetric shapes that are easily defined by a relatively small number of numeric parameters.

Diagram 530 provides an illustrated example for describing features. In diagram 530, an envelope 534 of a voxel space 532 can contain features 540 and 542. Feature 540 can be uniquely identified as Feature0001, which is a feature identifier. The feature type of Feature 540 can be a building. Feature 542 can be an air conditioning unit positioned on top of the building. As shown, each feature 540, 542 is formed from single shape primitives 550 and 552, which are both boxes. Features can include any number (from 1 to N) of shape primitives. Each shape can include (be mapped to) a set of voxels. For example, three voxels 560 can form shape 550. In one embodiment, the voxel GIS 440 can include software implemented tools to automatically detect and define shapes, features, and envelopes in a given voxel space.

While any number of shape primitives can be supported by system 400, some common shape primitives include boxes, cylinders, spheres, and cones.

In one embodiment, shape primitives used by system 400 can conform to existing standards for enhanced compatibility. For example, shape primitives can conform to Open Graphics Library (OpenGL) standards for three dimensional (3D) computer graphics. In one embodiment, Coin3D, which is a C++ object oriented retained mode 3D graphics Application Program Interface (API) used to provide a higher layer of programming for OpenGL, objects can be mapped to shape primitives as follows: a box equates to a SoCube; a cylinder equates to a SoCylinder; a sphere equates to a SoSphere; and, a cone equates to a SoCone. In another embodiment, mappings to geospatial scheme of the National Geospatial-Intelligence Agency (NGA) can be as follows: a box equates to a RectangularPrism; a cylinder equates to a Vertical Cylindrical; a sphere equates to a spherical; and, a cone can have no equivalent. In still another embodiment, mappings to a computer aided design (CAD) scheme can be as follows: a box equates to an Axis Aligned Bounding Box (AABB); a cylinder equates to a Cylinder, Flat Ends; a sphere equates to a Cylinder, Round Ends, Zero Length.

In one embodiment, the GIS query engine 441 of the Voxel GIS 440 can perform seamless and user transparent queries across the different databases 130, 450. It should be noted, that although being referred to as different databases 130, 450 a single unified database (or other indexed repository) can be utilized in the disclosure for both voxel-indexed records 132 and feature indexed records 452.

FIG. 5 provides a diagram 560 useful for distinguishing between voxel database 130 content and feature database 450 content. As shown, voxel-level semantics 562 can include visual attributes (color, contrast, intensity, brightness), spectral signature attributes (Multispectral Imaging (MSI), Hyperspectral Imaging (HSI)), material composition attributes, and the like. Voxel-level semantics 562 (e.g., data stored in voxel database 130) indicate that a data element "is part of a . . . "; "is made of . . . "; and/or "has an appearance of . . . " something.

Feature-level semantics 564 can include a feature identifier, a feature type, and feature attributes, such a physical dimensions, geographic names, functional usage information, and the like. Feature-level semantics 564 (e.g., data stored in feature database 450) indicate that a data element "is a . . . "; "has identifiable components consisting of . . . "; "has feature specific attributes of . . . "; and/or "has dimensions of . . . " something.

Each feature of the feature database 450 can occupy a unique volume of volumetric space 120, which corresponds to a set of unique voxels 122 of the voxel database 130.

FIG. 6 illustrates a set of tables 610, 620, 630, 640 for a voxel GIS in accordance with an embodiment of the disclosure. In one embodiment, the tables 610, 620, 630, 640 can be RDBMS tables in third normal form. The tables 610, 620, 630, 640 can include a plurality of records (e.g., records 132 and 452).

Voxel table 610 includes a VID 612, which is a unique identifier for each voxel. SID 613 can be a unique identifier for a shape primitive which forms all or part of a shape envelope. Any quantity (1 . . . N) of attributes can be associated with each unique voxel of table 610. For example, each detailed semantic content element can have an associated attribute 614, 616. In one embodiment, each attribute 614, 616 in the voxel table 610 can have at least two values, such as a lower value and an upper value. The multiple values can be used to record different levels of certainty for each attribute 614, 616. For example, one source can report a first value of an attribute 614, 616 with a definable degree of certainty and a different value can be reported for the same attribute 614, 616 with a different degree of certainty. Although two values (lower and upper) are shown for each attribute 614, 616, any number of values (1 . . . N) can be used in table 610.

Each record in shape table 620 can include a unique shape identifier, SID 622. A secondary key for a feature ID 624 can also be included. Table 620 can also include a type 626 attribute. A set (0 . . . N) of additional shape specific attributes 628 can also exist.

Each unique feature can be associated with a feature identifier, FID 632. In one implementation, different types of tables 630, 640 can exist, one for each unique category or type of object, which corresponds to a feature. For example, one table 630 can exist for buildings and another table 640 can exist for tree groves. Each table 630, 640 can have an associated set of attributes 634, 644, which are unique to a specific type of object. It should be appreciated that arrangements of tables 610, 620, 630, 640 are presented to illustrate a concept expressed herein and are not to be construed as a limitation of the disclosure.

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in FIGS. 1-6 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving spatially referenced information of a sub-volume of real-world volumetric space, wherein said spatially referenced information comprises at least two of raster-based imagery information, elevation information, and point cloud information; and
combining the spatially referenced information in a volumetric storage unit (VSU) database with at least one processor, wherein the VSU database represents a volumetric storage space comprising a set of unique VSUs, wherein data elements are stored to specific ones of the VSUs, wherein a spatial position of the data elements within the volumetric storage space is defined at least in part by which of the VSUs the data elements are stored, wherein at least a portion of the VSUs comprises data from two or more of the raster-based imagery information, the elevation information, and the point cloud information; and wherein the VSU database comprises a heterogeneous database for internal storing of different semantic content in different manners, which are transparent to external entities that view the VSU database as a single unified database having a consistent externally facing interface, wherein the heterogeneous database comprises at least a VSU table for storing a plurality of records of VSUs indexed by a unique VSU identifier and a feature table for storing a plurality of records of features indexed by unique feature identifier, wherein a spatial position of each of the features within the volumetric storage area is determined based on which VSUs the feature is indexed to.

2. The method of claim 1, further comprising:
supporting a plurality of different three dimensional virtual environments having different geospatial formatting and content needs using the data elements of the VSU database, wherein at least one of the different three dimensional virtual environments uses a vector based terrain model, wherein supporting the at least one of the different three dimensional virtual environments that uses a vector based terrain model comprises:
converting data elements of the volumetric storage space from a raster-based internal format to a vector based terrain format with the at least one processor, wherein the vector based terrain format is provided to the at least one of the different three dimensional virtual environments.

3. The method of claim 1, wherein the spatially referenced information comprises the imagery information in a raster based format, wherein the spatially referenced information comprises elevation encoded information represented as a raster or as a triangular irregular network, and wherein the spatially referenced information comprises point cloud information comprising a set of points on a surface.

4. The method of claim 3, wherein the elevation encoded data comprises digital elevation model (DEM) or digital surface model (DSM) information, and wherein said point cloud information comprises light detecting and ranging (LiDAR) information.

5. The method of claim 3, wherein the imagery information comprises imagery data encoded in a raster based format which is specified in a digital image product, and wherein the imagery data comprises video data which is specified in a video product, wherein the elevation encoded information comprises digital elevation model (DEM) or digital surface model (DSM) information which is specified within a DEM or DSM product, wherein the point cloud information comprises light detecting and ranging (LiDAR) information, and said method further comprising:
supporting a plurality of different three dimensional virtual environments having different geospatial formatting and content needs using the data elements of the VSU database wherein the different three dimensional virtual environments comprise an environment of at least one semi-autonomous force simulator, an environment of at least one tactical engagement simulator, and an environment of at least one immersion simulator, and an environment of at least one live simulator, and;
streaming VSU database data to executing ones of the different three dimensional virtual environments in real-time or near real time, wherein terrain of an interactive user interface of the executing ones of the different three dimensional virtual environments is visually constructed based on the streamed data from the VSU database.

6. The method of claim 1, wherein the VSU database stores high fidelity content of terrain having a six inch or smaller ground separation distance between datum points, wherein a density of data in the VSU database has reached a cross-over point, where it is more efficient to store equivalent data within the VSU database than it is to store equivalent data in a non-VSU geospatial database.

7. The method of claim 1, wherein the VSU database uses gridded voxel encoding.

8. The method of claim 1, wherein the VSU database uses sparse voxel encoding.

9. The method of claim 1, wherein the VSU database uses octree voxel encoding.

10. The method of claim 1, wherein the VSU database is a probabilistic storage mechanism, where each VSU related record of the VSU database has an associated certainty value is a value from zero to one hundred percent which is based upon a statistical analysis of the internally inconsistent data elements referenced against the VSUs, where a portion of the internally inconsistent data elements indicate that at least one object that displaces multiple VSUs is contained within the volumetric storage space, wherein at least another portion of the internal inconsistent data elements indicate that the at least one object is not contained within the volumetric storage space.

11. A computer program product for handling geospatially related data, the computer program product comprising:
a non-transitory computer readable storage medium having computer usable program code embodied therewith, the computer usable program code comprising:
computer usable program code operable to receive spatially referenced information of a sub-volume of real-world volumetric space, wherein said spatially referenced information comprises at least two of raster-based imagery information, elevation information, and point cloud information; and
computer usable program code operable to combine the spatially referenced information in a volumetric storage unit (VSU) database, wherein the VSU database represents a volumetric storage space comprising a set of unique VSUs, wherein data elements are stored to specific ones of the VSUs, wherein a spatial position of the data elements within the volumetric storage space is defined at least in part by which of the VSUs the data elements are stored, wherein at least a portion of the VSUs comprises data from two or more of the raster-based imagery information, the elevation information, and the point cloud information, and wherein the VSU database comprises a heterogeneous database for internal storing of different semantic content in different manners, which are transparent to external entities that view the VSU database as a single unified database having a consistent externally facing interface, wherein the heterogeneous database comprises at least a VSU table for storing a plurality of records of VSUs indexed by a unique VSU identifier and a feature table for storing a plurality of records of features indexed by unique feature identifier, wherein a spatial position of each of the features within the volumetric storage area is determined based on which VSUs the feature is indexed to.

12. A method for handling geospatially related data comprising: capturing, by a plurality of sensors, raw data that geospatially corresponds to a real-world volumetric space, wherein the raw data comprises point cloud data for a surface of the real-world volumetric space, comprises imagery and video data for the surface of the real-world volumetric space, and comprises elevation data for the surface of the real-world volumetric space;

segmenting the real-world volumetric space into a plurality of uniquely identified volumetric units (VUs), wherein datum of the raw data is indexed against the uniquely identified VUs;

mapping each of the uniquely identified VUs to at least one volumetric storage unit (VSU) of a VSU database, wherein the VSU database represents a volumetric storage space comprising a set of unique VSUs, wherein data elements are stored to specific ones of the VSUs, wherein a spatial position of the data elements within the volumetric storage space is defined at least in part by which of the VSUs the data elements are stored, and wherein the VSU database comprises a heterogeneous database for internal storing of different semantic content in different manners, which are transparent to external entities that view the VSU database as a single unified database having a consistent externally facing interface, wherein the heterogeneous database comprises at least a VSU table for storing a plurality of records of VSUs indexed by a unique VSU identifier and a feature table for storing a plurality of records of features indexed by unique feature identifier, wherein a spatial position of each of the features within the volumetric storage area is determined based on which VSUs the feature is indexed to; and storing the raw data within the data elements of at least one of the VSUs to which the uniquely identified VUs of the real world volumetric space are mapped, wherein each VSU of the VSU database stores point cloud data, imagery and video data, and elevation data.

13. The method of claim 12, further comprising:
receiving, by the VSU database, requests for terrain information from a plurality of different computing devices, each of the computing devices providing an interactive three dimensional virtual environment to at least one user;
for each computing devices associated with a request:
determining an interactive three dimensional virtual environment specific plug-in;
executing the interactive three dimensional virtual environment specific plug-in to convert the VSU database data into an interactive three dimensional virtual environment specific format; and
providing the converted VSU database data to a computing device that issued the request.

14. The method of claim 13, wherein the different computing devices comprise semi-autonomous force simulators, tactical engagement simulators, immersion simulators, and live simulators.

15. The method of claim 14, further comprising:
streaming the VSU database data to executing ones of the different computing devices in real-time or near real time, wherein terrain of an interactive user interface of the executing ones of the different computing devices is visually constructed based on the streamed data from the VSU database.

16. The method of claim 12, further comprising:
bifurcating semantic content of the raw data into VSU-level semantic content and feature-level semantic content;
storing VSU-level semantic content, wherein the VSU-level semantic content is contained in attributes of records having a unique VSU identifier; and
storing feature-level semantic content, wherein the feature-level semantic content is contained in attributes of records having a unique feature identifier.

17. The method of claim 16, further comprising:
receive information queries conveyed to the VSU database to query content stored in both the VSU records and feature records; and
generating, by the VSU database, a result for the query by cross-indexing the VSU records and the feature records.

18. The method of claim 12, wherein the VSU database comprises stored data elements that are internally inconsistent, which results in a naturally probabilistic storage format, said method further comprising:
receiving a request for VSU database information for a request defined volume of VSU space;
querying the VSU database to generate a response set of VSUs and attributes associated with the VSUs, wherein the set of VSUs includes the VSUs of the defined volume of VSU space; and
during the querying, dynamically determining a certainty level value for objects of the set of VSUs, wherein the certainty value is a value from zero to one hundred percent which is based upon a statistical analysis of internally inconsistent geospatial information referenced against the VSUs, where the internally inconsistent geospatial information corresponds to a volumetric unit of the real-world volumetric space in which an object has a probability of residing within; and
providing the response set of VSUs and attributes associated with the VSUs to a computing device having a user interface for a simulated three dimensional volume of space that corresponds to the defined volume of VSU space, wherein the computing devices comprises hardware and computer program products stored on a tangible storage medium and executable upon the hardware.

19. The method of claim 12, wherein the VSU database uses octree voxel encoding.

20. A system comprising:
a volumetric storage unit (VSU) database representing a volumetric storage space comprising a set of unique VSUs, wherein data elements are stored against specific ones of the VSUs, wherein a spatial position of the data elements within the volumetric storage space is defined at least in part by which of the VSUs the data elements are stored against, wherein said data elements comprise raster-based imagery information for a surface of a real world volumetric space, elevation information for the surface of the real world volumetric space, and the point cloud information for the surface of the real world volumetric space, wherein a least a portion of the VSUs each store a portion of the point cloud information, a portion of the raster-based imagery information, and a portion of the elevation information, and wherein the VSU database comprises a heterogeneous database for internal storing of different semantic content in different manners, which are transparent to external entities that view the VSU database as a single unified database having a consistent externally facing interface, wherein the heterogeneous database comprises at least a VSU table for storing a plurality of records of VSUs indexed by a unique VSU identifier and a feature table for storing a plurality of records of features indexed by unique feature identifier, wherein a spatial position of each of the features within the volumetric storage area is determined based on which VSUs the feature is indexed to; and at least one processor for managing the VSU database when used with a computing device.

21. The system of claim 20, wherein the elevation information comprises digital elevation model (DEM) or digital surface model (DSM) information, wherein the point cloud information comprises light detecting and ranging (LiDAR) information.

22. The system of claim 20, wherein the VSU database stores high fidelity data elements of terrain having a six inch or smaller ground separation distance between datum points, wherein the density of data elements in the VSU database has reached a cross-over point, where it is more efficient to store equivalent data within the VSU database than it is to store equivalent data in a non-VSU geospatial database.

23. A voxel database system comprising:

a voxel database comprising a plurality of voxel indexed records, wherein each voxel indexed record of the voxel database comprises data elements from different discrete products such that each voxel in the voxel database represents a combination of volumetrically stored data for all of the different discrete products, said different discrete products comprising point cloud products comprising point cloud data encoded in a light detecting and ranging (LiDAR) information format, imagery products comprising imagery and video data, and comprising elevation products comprising elevation data encoded in a digital elevation model (DEM) or digital surface model (DSM) format, and wherein the voxel database comprises a heterogeneous database for internal storing of different semantic content in different manners, which are transparent to external entities that view the voxel database as a single unified database having a consistent externally facing interface, wherein the heterogeneous database comprises at least a VSU table for storing a plurality of records of VSUs indexed by a unique VSU identifier and a feature table for storing a plurality of records of features indexed by unique feature identifier, wherein a spatial position of each of the features within the volumetric storage area is determined based on which VSUs the feature is indexed to; and at least one processor for managing the data of the voxel database and for supporting a plurality of different computing devices having different geospatial formatting and content needs from the data encoded in the voxel database.

24. The voxel database system of claim 23, wherein the voxel database stores high fidelity content of terrain having a six inch or smaller ground separation distance between datum points, wherein the density of the data in the voxel database has reached a cross-over point, where it is more efficient to store equivalent data within the voxel database than it is to store equivalent data in a non-voxel geospatial database.

25. The voxel database system of claim 23, said voxel database further comprising:

a plurality of voxel records in a voxel table, where each of the records has a unique voxel identifier, wherein said voxel database comprises hardware and computer program products stored on a tangible storage medium and executable upon said hardware, wherein said voxel table is stored in a tangible storage medium; and a plurality of feature records in a plurality of feature tables, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table; and a plurality of shape records in a shape table, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the voxel table comprises a foreign key to a shape identifier, wherein a one-to-many relationship exists between voxels and primitive shapes.

26. The voxel database system of claim 23, further comprising:

a plurality of simulation plug-ins each for a specific simulator, wherein said voxel server using said voxel simulation plug-ins is operable to provide external simulators with real-time streaming of terrain models based on voxel database encoded geospatial content.

* * * * *